United States Patent
DeVlieger (10) Patent No.: US 9,902,100 B2
(45) Date of Patent: Feb. 27, 2018

(54) METHOD AND SYSTEM FOR GLASS ENCAPSULATION MOLDS

(71) Applicant: Pfaff Molds LP, Charlotte, NC (US)

(72) Inventor: Troy DeVlieger, Sherrils Ford, NC (US)

(73) Assignee: PFAFF MOLDS LP, Charlotte, NC (US)

( * ) Notice: Subject to any disclaimer, the term of this patent is extended or adjusted under 35 U.S.C. 154(b) by 331 days.

(21) Appl. No.: 14/852,137

(22) Filed: Sep. 11, 2015

(65) Prior Publication Data

US 2016/0075062 A1 Mar. 17, 2016

Related U.S. Application Data

(60) Provisional application No. 62/049,171, filed on Sep. 11, 2014.

(51) Int. Cl.
*B29C 45/14* (2006.01)
*B29C 45/73* (2006.01)
*B29K 23/00* (2006.01)
*B29K 709/08* (2006.01)

(52) U.S. Cl.
CPC .. *B29C 45/14065* (2013.01); *B29C 45/14434* (2013.01); *B29C 45/73* (2013.01); *B29K 2023/16* (2013.01); *B29K 2709/08* (2013.01)

(58) Field of Classification Search
CPC .................. B29C 45/14065; B29C 45/14434
See application file for complete search history.

(56) References Cited

U.S. PATENT DOCUMENTS

| 4,915,395 | A | 4/1990 | Barteck | |
|---|---|---|---|---|
| 5,061,429 | A | 10/1991 | Yoshihara et al. | |
| 5,916,600 | A * | 6/1999 | Dubay | B29C 33/0044 264/252 |
| 6,120,274 | A | 9/2000 | Gerig et al. | |
| 6,754,971 | B1 * | 6/2004 | Hagenmeyer | B29C 44/58 33/520 |
| 7,754,128 | B2 | 7/2010 | Amano et al. | |
| 8,323,540 | B2 | 12/2012 | Miyabe et al. | |
| 2008/0031991 | A1 | 2/2008 | Choi et al. | |
| 2011/0045123 | A1 | 2/2011 | Nakata et al. | |
| 2013/0086855 | A1 * | 4/2013 | Grandgirard | B29C 45/14065 52/204.591 |
| 2016/0303783 | A1 * | 10/2016 | Koganezawa | B29C 45/14778 |
| 2017/0165883 | A1 * | 6/2017 | Yu | B29C 45/14065 |

OTHER PUBLICATIONS

"The Enpo UR-121 Electro Metal Serface Hardening Device," Rus Sonic Technoloygy, Inc., 2009, retrieved from http://www.rusonic.com/h2.htm, 4 pages.
"Mold Release Coatings," NANOPLAS, Inc., 2015, retrieved from http://nanomoldcoating.com/mold-release-coatings, 5 pages.
International Search Report and Written Opinion for International (PCT) Patent Application No. PCT/US15/49753, dated Dec. 4, 2015, 8 pages.

* cited by examiner

*Primary Examiner* — Ryan Ochylski
(74) *Attorney, Agent, or Firm* — Sheridan Ross PC (57) ABSTRACT

An injection molding apparatus is provided that is suited for rubber injection and glass-encapsulation molding. A gap or interior portion of the mold for receiving a glass structure is provided, and the gap is adjustable by manipulation of a user-interface portion that extends outside of the mold and/or through the properties of thermal expansion based on select materials.

20 Claims, 8 Drawing Sheets

METHOD AND SYSTEM FOR GLASS ENCAPSULATION MOLDS

This U.S. Non-Provisional Patent Application claims the benefit of priority from U.S. Provisional Patent Application Ser. No. 62/049,171, filed Sep. 11, 2014, the entire disclosure of which is hereby incorporated by reference in its entirety.

FIELD OF THE INVENTION

The present invention relates generally to an injection mold for glass encapsulation and, more particularly, to an injection mold for glass encapsulation with mechanical adjustment features and which derives advantages from thermal expansion of various components.

BACKGROUND OF THE INVENTION

Generally, a glass panel or a side fixed glass panel (e.g. for vehicles) is integrated with a synthetic resin mold having a predetermined shape so as to increase the strength of the glass panel and to allow the glass panel to be efficiently coupled to a packing The process wherein the synthetic resin mold is integrated with the edge of the glass panel is referred to as glass encapsulation. However, "glass encapsulation" as used herein is not limited to any particular intended use or specific part-making operation. Glass encapsulation, as used herein, refers generally to rubber and EPDM injection molding in conjunction with one or more glass features and the various concerns and requirements associated therewith.

Rubber (EPDM) injection molds typically must be heated to approximately 350° to 410° F. to allow the injected material to cure or vulcanize properly. Accordingly, individual pieces of a mold that form a cavity in which the rubber is injected must be fit together with extreme precision. Excessive gaps between such mold portions can result in undesired "flash" of excess rubber which must be removed prior to processing or further use of the part. Flash may also damage the mold.

In glass encapsulation mold applications, sealing of the mold to avoid flash is particularly difficult, as a pane of glass is typically inserted into and confined within the mold. The mold must therefore seal against the glass during injection and curing of the rubber to avoid flash without crushing or breaking the glass.

The thickness of inserted glass can vary on average by as much as ±0.3 mm or ±0.012". To compensate for this thickness variation, molds may be designed to allow adjustment of the "glass gap". The position of a mold part that seals against the glass (referred to herein as "glass saddle" or "glass insert" or) is adjustable. A known method of adjustment requires an exchange of fixed shims under the glass saddle. This in turn requires partial disassembly of the mold. Such processes are very time consuming and difficult due to the operating temperature of the mold and other factors. Additionally, such processes typically require accessing a tight, inaccessible, and dangerous location by operators. Accordingly, known processes are time consuming, inefficient, and pose a number of safety risks.

SUMMARY OF THE INVENTION

Accordingly, there has been a long-felt but unmet need to provide a system and method for glass encapsulation molding that avoids various problems and shortcomings of the prior art. It is an object of the present invention to provide a glass encapsulation system and method with adjustable mold parts and enhanced cooling characteristics. It is a further object of the present invention to provide a mold structure with an adjustable glass saddle wherein the glass saddle is adjustable by a user from a location exterior to the mold and wherein the adjustable features are provided such that a user may interface with the features without deconstructing or entering the mold.

In one embodiment a mold is provided wherein the mold comprises a glass saddle comprising a material with a higher rate of thermal expansion than surrounding, adjacent, and/or related mold materials and portions. In such embodiments, glass saddle portions of the mold are designed and machined to precise specifications. At room temperature, a gap of at least approximately 0.03 mm (0.001 inches) is provided between the glass saddle and adjacent or surrounding mold cavity parts. This gap allows proper functioning of the device, including related mechanical adjustment systems.

In certain embodiments, a mechanical adjustment system for user-operated control of the glass gap or saddle is provided, wherein the mechanical adjustment system comprises adjustable wedges and springs in communication with a user-interface that extends outside of the mold. In preferred embodiments, the user interface comprises a shaft with a dial extending between at least one adjustable wedge and an exterior of the mold where it is accessible by a user. Rotation of the shaft provides for a movement of the wedge(s) and/or spring(s) to affect movement of the glass saddle and an opening or closing of the glass gap.

In various embodiments, once a desired gap is set, the mold may be heated to a desired operating temperature. Due to the provision of a glass saddle comprising a material with a higher rate of thermal expansion than surrounding mold materials, the saddle expands faster and closes first, thus creating a press fit with the surrounding mold cavity parts. This closure helps eliminate, or at least reduce, the risk of flashing of mold rubbers.

Various embodiments of the present invention contemplate providing a mold comprising cooling features to reduce the time needed to allow certain portions of the mold to cool, and thereby reduce the time required to make adjustments to the mold. For example, in certain embodiments, channels are provided that extend between the glass and toward an exterior portion of the mold. Air, water, oil, and/or other suitable fluids are provided to enhance cooling operations of the glass saddle which is generally provided toward an interior portion of the mold. Cooling operations release the aforementioned press fit of the glass saddle. Such features and embodiments reduce or eliminate the need to disassemble and/or reassemble the mold and greatly reduce machine down-time required to adjust the glass saddle and/or glass gap.

In various embodiments, heating of the mold is achieved by heating of mounting plates through electrical heating members such as heating bars or resistive heating elements. Heat is then conducted through a remainder of the mold assembly. Alternatively, thermal heating oil may be directed through various parts of the mold assembly to heat various features. Thermal energy is preferably conducted to the glass saddle, which expands as it is heated and press-fits with the upper mold section. In various embodiments, this press-fit prevents manual manipulation of the user interface and cooling operations are required to contract the glass saddle and enable or re-enable use of the user-interface.

In various embodiments, cooling of a mold assembly and/or particular features of a mold assembly is achieved by directing a fluid through cooling channels provided in the mold assembly. In preferred embodiments, at least one cooling channel is provided as a closed conduit for carrying a cooling fluid through portions of the mold assembly and promoting heat transfer from the mold assembly to the fluid, which is then directed or carried away from the assembly. Vent channels are also contemplated, either in addition to or in lieu of one or more closed cooling channels. Vent channels are contemplated as comprising vent features such as apertures in specific portions of the mold assembly to allow heat to convect from the mold assembly and/or mold cavity.

Accordingly, the present invention has been made keeping in mind the above problems occurring in the prior art, and the present invention provides an injection mold for glass encapsulation, which is constructed to put a glass panel between upper and lower molds and to integrally form a mold along an edge of the glass panel, for example.

In various embodiments, methods of EPDM molding are provided. In one embodiment, for example, a method is providing comprising the steps of: providing a mold cavity, the mold cavity comprising an adjustable surface for receiving a glass panel. The adjustable surface is provided in force-transmitting communication with at least one of a wedge and a spring, and said adjustable surface is adjustable by manipulation of a user-interface extending outwardly from the mold cavity. A glass panel is inserted into the mold cavity, wherein at least one surface of the glass panel is provided in contact with the adjustable surface. The position of the adjustable surface is adjustable by manipulation of the user-interface, thereby adjusting the magnitude of a gap between the adjustable surface and the mold cavity. The mold is then heated to a desired operating temperature, wherein heating of the mold causes the adjustable surface to expand and wherein the expansion of the adjustable surface creates an interference fit between at least a portion of said adjustable surface and at least a portion of the mold cavity. A moldable material is then injected into the mold cavity and is allowed to form to at least one of an inner-surface of the mold cavity and the glass panel. To extract a molded part and/or facilitate cooling of the device, the process may be reversed. That is, in certain embodiments, the adjustable surface may be adjusted in the opposite direction to re-create a gap between the adjustable surface and the mold cavity and facilitate cooling of the product and various mold surfaces.

U.S. Patent Application Publication No. 2008/0031991 to Choi et al., which is hereby incorporated by reference in its entirety and for all purposes, discloses an injection mold for glass encapsulation. Various features of Choi may be employed in embodiments of the present invention. For example, Choi provides an injection mold including a support unit supporting a lower portion of the glass panel and moving up and down along a support recess which is defined in the lower mold, a shock absorbing unit having a cylinder to press and support the support unit using elastic force, and a pressure control unit maintaining hydraulic pressure in the cylinder at a preset pressure. Such features, and others, of Choi may be employed in various embodiments of the present invention.

U.S. Pat. No. 8,323,540 to Miyabe et al., which is hereby incorporated by reference in its entirety for all purposes, discloses molding die and method of molding. Miyabe discloses a mold die and method of use including movable components and clamping features which may be incorporated in various embodiments of the present invention.

U.S. Pat. No. 6,120,274 to Gerig et al. provides a mold assembly for holding a panel assembly, such as a glass panel, in order to injection mold a gasket or similar feature around the panel. Gerig et al. further provide moveable pressure pads within the mold assembly to accommodate glass panels and other mold features. Gerig et al., however, fail to disclose various novel features of the present disclosure including, for example, heating and cooling features including materials provided in a glass saddle with a different thermal expansion rate than other features of the mold cavity.

In one embodiment, a mold assembly for glass encapsulation molding is provided, the mold assembly comprising a mold cavity, the mold cavity comprising an adjustable surface for receiving a glass panel around which a mold material is to be provided. A user-interface is provided external to and/or extending away from the mold cavity such that the user-interface is accessible to a user. The user-interface comprises or is connected to a shaft extending into the mold assembly. The user-interface is in force-transmitting communication with the shaft and at least one of ramped surface and a spring provided inside the mold assembly, and a position of said adjustable surface is adjustable by manipulation of said user-interface. This position would not otherwise be adjustable without cooling and/or disassembling the mold assembly. The adjustable surface comprises a first material having a coefficient of thermal expansion that is greater than a coefficient of thermal expansion of at least a portion of the mold cavity, such that the adjustable surface expands and contracts at a greater rate than a remainder of the mold cavity and wherein expansion of the adjustable surface creates a press fit between at least a portion of said adjustable surface and at least a portion of the mold cavity.

In yet another embodiment of the present disclosure, a mold assembly for molding at least one attachment member on a glass member is provided, the mold assembly comprising first and second mold sections, the first mold section comprising a first sheet holding surface. An adjustable pressure pad is provided in force-transmitting communication with the first sheet holding surface, and a first mold cavity is defined by at least one of the first mold section, the second mold section, and the adjustable pressure pad. At least one resilient member for urging the adjustable pressure pad toward the first mold section is provided for holding a glass member therebetween. At least one of the first and second mold sections includes a moldable material delivery system for directing moldable material such as rubber. An adjustment member comprising a shaft extending within the mold assembly and a user-interface in force-transmitting communication with the shaft are also provided, the user-interface provided external to the mold cavity and accessible to a user to enable manipulation and adjustment of internal components of the mold assembly.

In various embodiments, methods of glass encapsulation molding are provided. In one embodiment, a method of glass encapsulation molding includes providing a mold cavity, the mold cavity comprising an adjustable surface for receiving a glass panel. The adjustable surface is provided in force-transmitting communication with at least one of a ramped surface and a spring, and the adjustable surface is adjustable by manipulation of a user-interface extending outwardly from the mold cavity. A glass panel is inserted into the mold cavity, and at least one surface of the glass panel is provided in contact with the adjustable surface. Prior to molding operation, a position of the adjustable surface is adjusted by manipulation of the user-interface. The mold is then heated to a desired operating temperature, and heating of the mold causes the adjustable surface to expand such that the adjustable surface creates an interference or press fit between at least a portion of the adjustable surface and at least a portion of the mold cavity. A moldable material, such as rubber, is then injected into the mold cavity and allowed to form to at least one of an inner-surface of the mold cavity and the glass panel.

In certain embodiments, methods and systems for glass encapsulation molding including enhanced adjustment features are provided. In preferred embodiments, a rate of thermal expansion of certain components (e.g. glass saddle) of a mold assembly is greater than adjacent or surrounding components such that expansion and contraction of the component(s) (e.g. glass saddle) occurs faster than surrounding features and thereby enables a desirable fit of the glass saddle (for example) and glass member provided within the mold assembly. In various embodiments, a user-interface feature is provided external to the mold cavity and accessible to a user. However, thermal expansion properties of interior components of the assembly, particularly when the mold assembly is heated, prevent manual adjustment of the user-interface above certain temperatures. Accordingly, various devices and methods of the present disclosure contemplate the provision of cooling channels through which fluids (air, water, oil, coolants, etc.) are forced to cool internal components (e.g. the glass saddle) of the mold assembly to a temperature at or below which manual adjustment of the user-interface and connected components is enabled. In this manner, adjustments may be performed far quicker than is contemplated by prior art devices based on enhanced cooling features and/or a reduced need to cool and disassemble the mold. Various methods of the present disclosure contemplate process steps of cooling internal components by forcing or directing cooling fluid through fluid channels as an enabling step prior to manually adjustment of a "glass gap" using the user-interface.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 1:
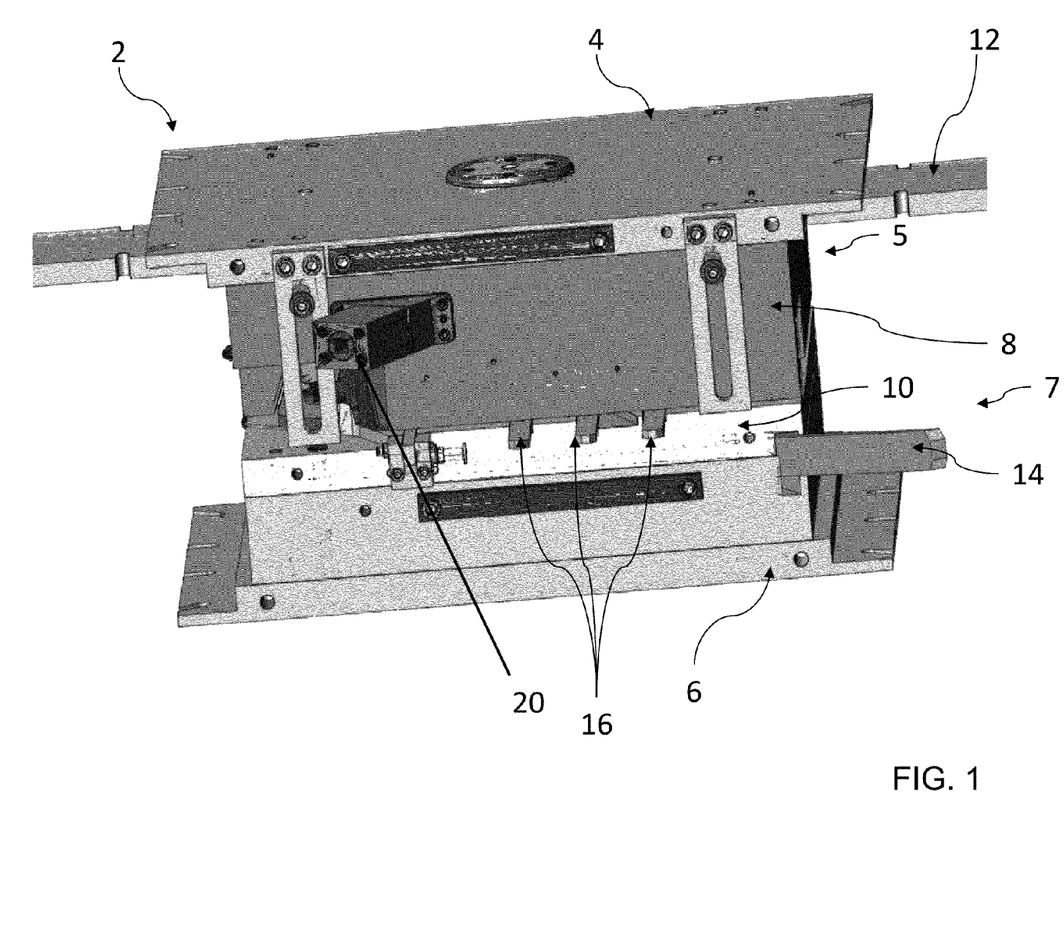
FIG. 1 is a front perspective view of a glass encapsulation mold device according to one embodiment of the present invention.

FIG. 1 is a perspective view of a glass encapsulation mold assembly 2 according to one embodiment of the present invention. As shown, the mold assembly 2 comprises an upper clamp plate 4 and an upper mold portion 5, a lower clamp plate 6 and lower mold portion 7, with a mold cavity 8 provided therebetween. The lower portion 7 of the mold assembly 2 comprises a cover plate 10 secured to the lower clamp plate 6 by bolts or other fasteners. The mold assembly comprises a user-interface 20 extending outwardly from and provided externally to the mold cavity 8. The user-interface 20 is operable to adjust a "glass gap" or void within the mold cavity 8. In certain embodiments, the user-interface 20 comprises a dial, such that the gap is adjustable by a user from a location outside of the mold cavity by rotation of the dial. It will be expressly recognized, however, that the present disclosure is not limited to user-interfaces comprising a dial and that various alternative arrangements and features for the user-interface are contemplated. Such features include, for example, digital displays and inputs, switches, levers, etc. The user-interface 20 may extend from an interior of the mold cavity 8 by any amount and no limitation with respect to this distance or extension is expressed or implied herein. Similarly, although an exemplary mold device 2 is provided, it will be recognized that a user-interface may be provided on any number and type of mold device(s) for forming various molded parts. As further shown in FIG. 1, the mold assembly 2 comprises levers 14, 16 for mechanical adjustments of moving components within the mold cavity 8.

Figure 2:
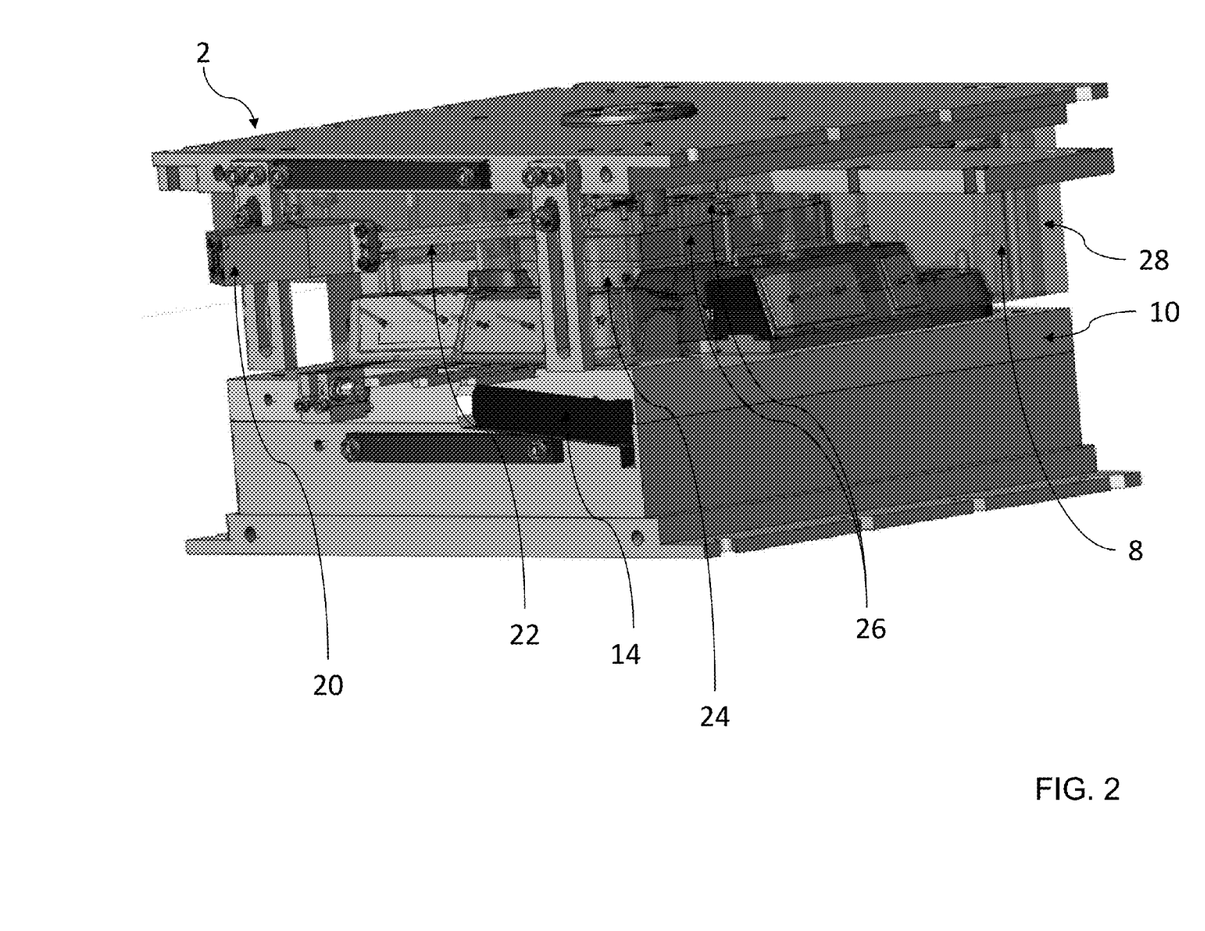
FIG. 2 is a front perspective view of a glass encapsulation mold device according to one embodiment of the present invention.

FIG. 2 is a perspective view of the mold assembly 2 with various components shown in phantom or transparent view for illustrative purposes. As shown, a user-interface member 20 is provided that extends externally from the mold cavity 8 and surrounding mold cavity plate 28. A connecting shaft 22 is provided that extends internally of the mold cavity 8 and mold cavity plate 28. The shaft 22 connects the user-interface 20 and actuating means for the glass gap or glass saddle 24. Actuating means of the present disclosure include, for example, worm gears, ramped surfaces, and threaded features for converting a rotational motion of the shaft 22 into a linear motion or displacement of the glass saddle 24. At least one ramped surface, which may include at least one adjustable wedge 26 is provided, the wedge(s) 26 comprising internal springs, as shown and described in more detail herein.

Figure 3:
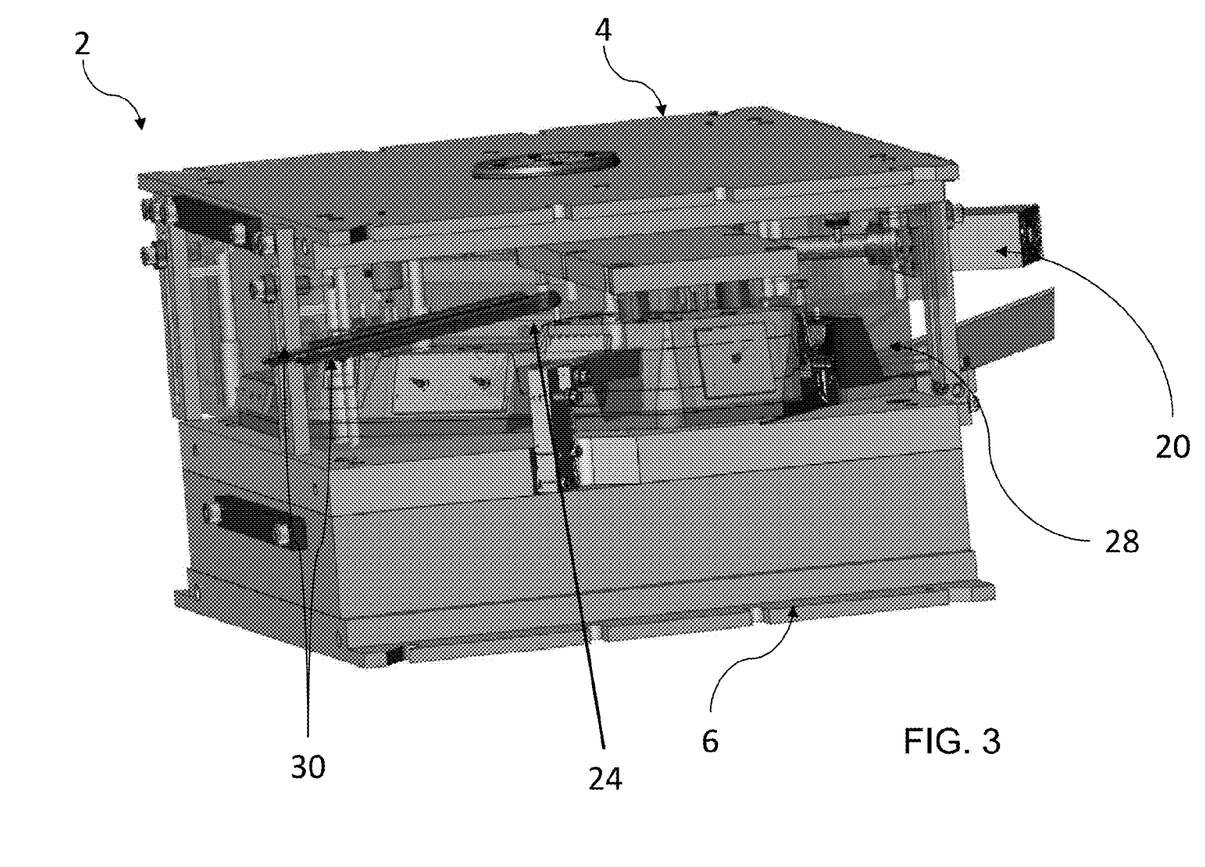
FIG. 3 is a front perspective view of a glass encapsulation mold device according to one embodiment of the present invention.

FIG. 3 is a perspective view of a mold device 2 with various components shown in phantom or transparent view for illustrative purposes. As shown in FIG. 3, cooling channels 30 extend from an interior of the mold cavity and from the glass saddle 24. In the depicted embodiment, a pair of substantially tubular cooling channels 30 is provided for conveying heat from an interior portion of the mold, and preferably the glass saddle, to an exterior portion of the mold. Cooling channels 30 thus provide for venting and enhanced cooling characteristics of the mold cavity and glass saddle 24 such that the mold may be quickly cooled after and/or between mold operations, thereby reducing downtime of the mold and enhancing efficiency of glass encapsulation mold operations.

For example, in certain embodiments, channels 30 are provided that extend between the glass saddle and an exterior portion of the mold. Air, water, oil, and/or other suitable fluids are provided to enhance cooling operations of the glass saddle 24 which is generally provided toward an interior portion of the mold. Such fluids may be forced to enhance convection and cooling. Alternatively, at least one of the channels 30 comprises a passive conduit wherein heat is allowed to flow naturally from proximal the glass saddle 24. Cooling operations release the aforementioned press fit of the glass saddle 24. Such features and embodiments reduce or eliminate the need to disassemble and/or reassemble the mold and greatly reduce machine down-time required to adjust the glass saddle or glass gap.

In various embodiments, it is contemplated that a press-fit is formed between the glass saddle and a remainder of the mold cavity based on different thermal expansion rates of the features. It is also contemplated that, in order to release this fit or connection, a cooling process and/or cooling features are required prior to operating a dial or user-interface. In certain embodiments, the cooling channels 30 are provided and may be supplied with air or fluid to enhance cooling of internal components of the mold assembly 2. The cooling channels 30 may comprise separate channels, or may comprise a closed loop wherein fluid is transferred or pumped into and out of an interior of the mold and proximal to the cavity to transfer heat from the glass saddle. Such cooling enables movement of the user-interface which is operable to move adjustable features (e.g. wedges) provided internal to the mold assembly and adapted to adjust a position of the glass saddle.

Figure 4A:
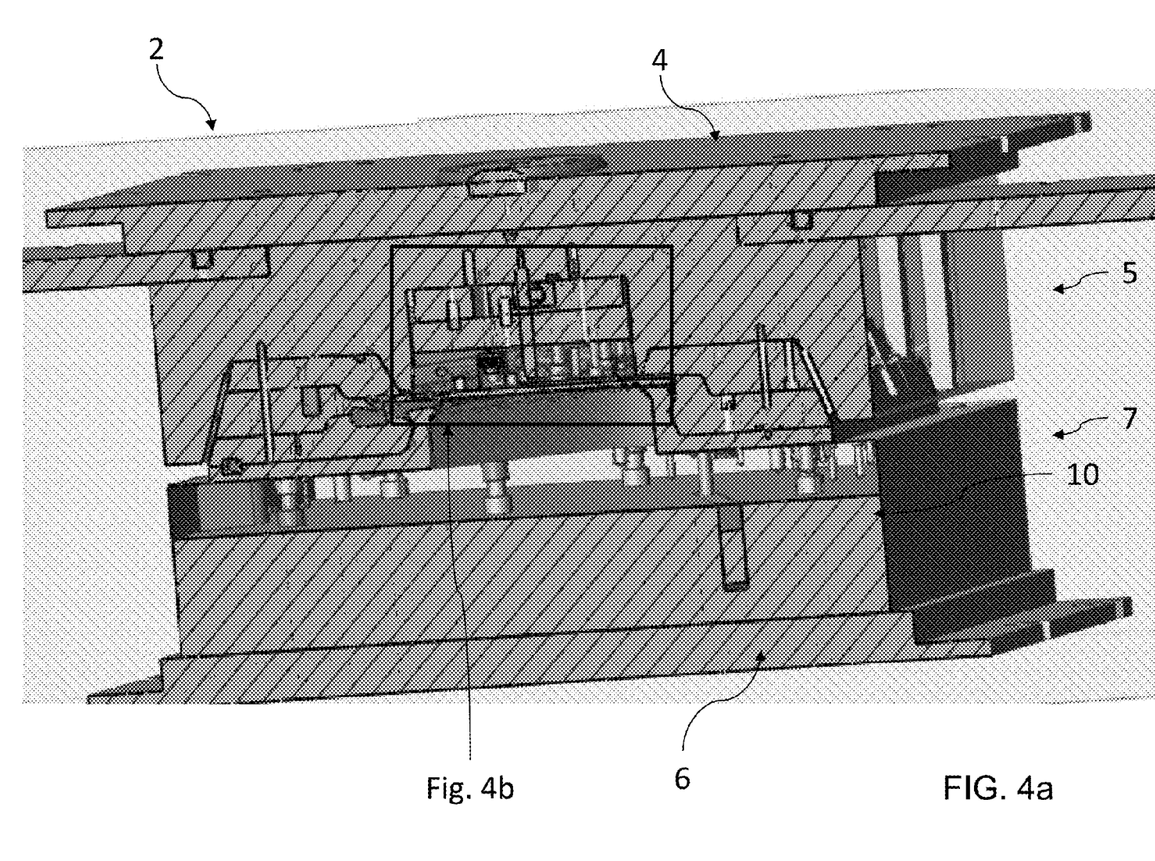
FIG. 4*a* is a cross-sectional view of one embodiment of the present disclosure.
Figure 4B:
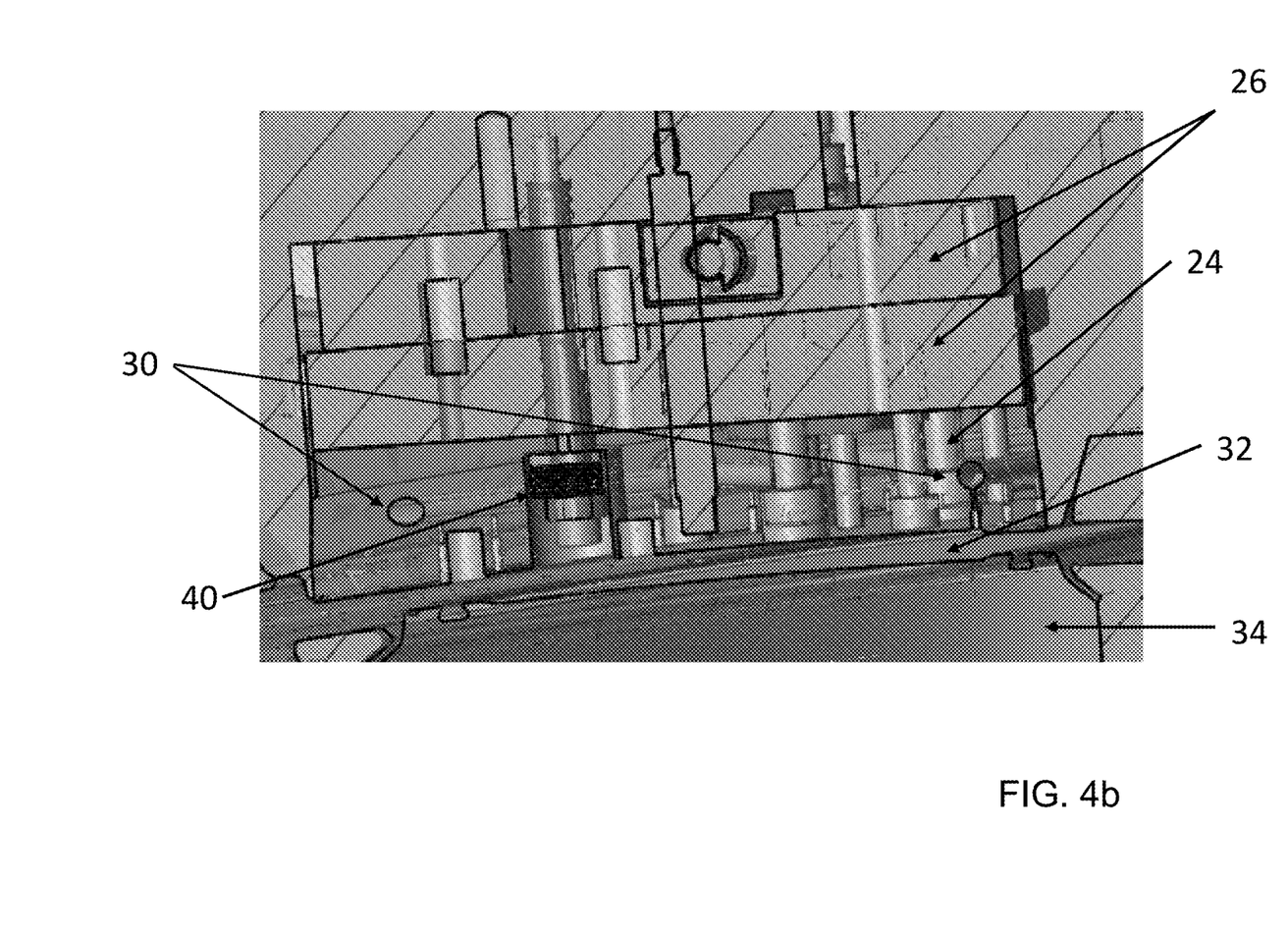
FIG. 4*b* is a detailed cross-sectional view of the embodiment of FIGS. 4*a*.

FIG. 4a is a cross-sectional perspective view of a mold device 2 as shown and described herein. FIG. 4b is a detailed cross-sectional view of the embodiment of FIG. 4a. As shown, adjustable wedges 26 are provided for adjusting the height of the glass gap 32. The glass saddle 24, which is shown as being transparent for illustrative purposes in FIG. 4b, comprises a material with a higher rate of thermal expansion than surrounding mold materials. Accordingly, the glass saddle 24 will expand and contract faster than surrounding mold cavity parts, thereby reducing the glass gap 32 and creating a press fit with the mold core plate 34. This closure helps eliminate, or at least reduce, the risk of flashing of mold rubbers.

A thickness of an inserted glass material in the mold can vary on average by as much as ±0.3 mm or ±0.012". To compensate for this thickness variation, the mold is designed to allow adjustment of the glass gap 32. The position of the glass saddle 24 is adjustable via at least one of thermal expansion and mechanical adjustment means, including adjustable wedges 26 and springs 40. Specifically, a user-interface 20 may be adjusted to drive a precision worm gear or thread (not shown) and actuate the connecting shaft 22; the connecting shaft 22 in turn transmits a force to an interior of the mold cavity such as a gear or threaded element in connection with wedge 26 and/or spring 40. Thus, by rotational movement of the user-interface 20, a corresponding movement of the glass saddle 24, and therefore the glass gap 32 provided interior to the mold apparatus is affected, and the glass gap 24 is closed or opened through mechanical adjustment means.

In preferred embodiments, the glass saddle 24 comprises at least one material with a higher rate of thermal expansion than the surrounding mold material. In various embodiments, the glass saddle 24 is contemplated as comprising a beryllium-copper derivative that is preferably pre-hardened. It has been shown that aluminum, for example, has a thermal expansion and contraction rate that is greater than various mold steels, but the difference between aluminums and mold steels in this regard is too extreme to provide a reliable and repeatable adjustment of mold features. The Mold Max® copper alloy from Uddeholm is one example of a material that is contemplated for use with the glass saddle 24. The glass saddle 24 is designed and machined to precise dimensions. In certain embodiments, a gap larger than 0.03 mm (0.001") exists between the glass saddle 24 and the surrounding mold cavity parts when the devices are provided at room temperature. Such a gap 32 is provided to allow proper function of the mechanical adjustment means. In various embodiments, adjustment means comprise wedges 26 and springs 40 provided in communication with the glass saddle 24. The user-interface 20 and shaft connect to the wedge(s) 26 to allow user-operated movement thereof. When the user-interface 20 is manipulated, the glass saddle 24 is actuated in a forward or reverse direction, resulting in an opening or closing of the glass gap 32. Once a desired gap is set, the mold 2 can be heated to a desired operating temperature. Because the material of the glass saddle expands more than the material of the surrounding mold cavity parts, the previously existing gap 32 between the glass saddle 24 and the mold cavity parts will be closed. When sufficiently heated, the glass saddle 24 forms a press fit with the surrounding mold cavity parts.

Figure 5:
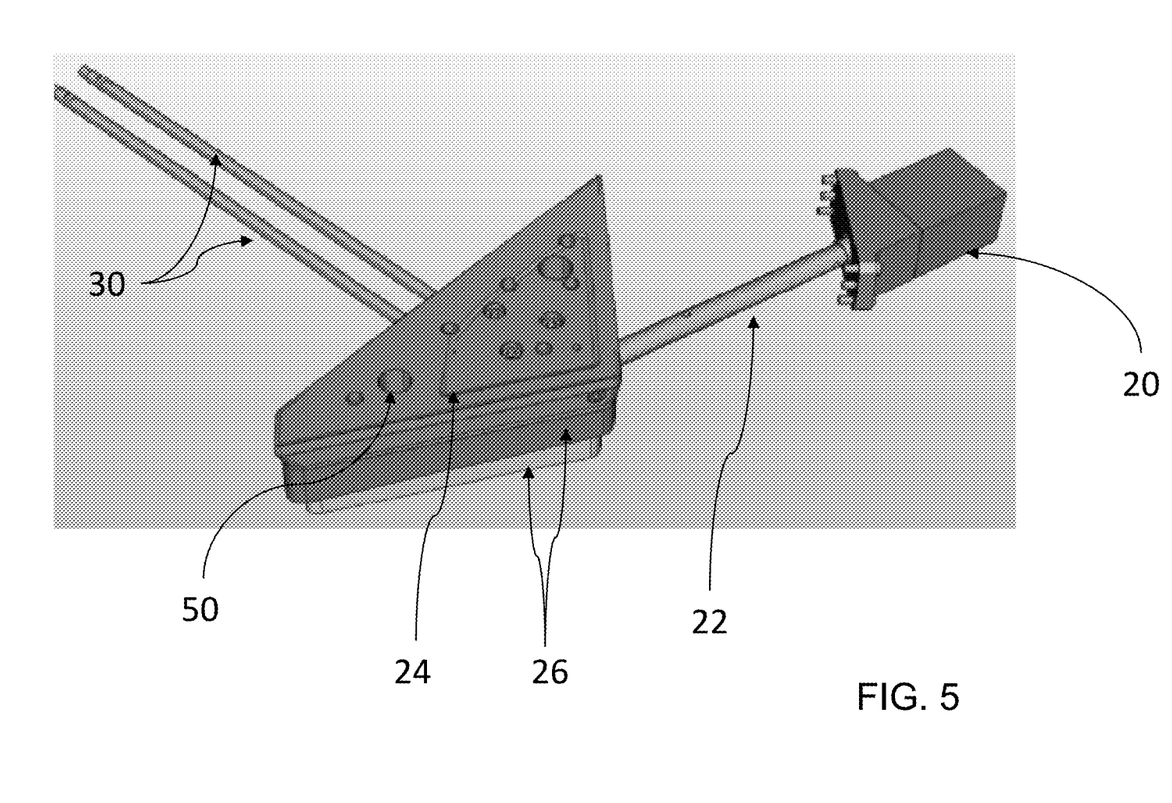
FIG. 5 is a perspective view of components of one embodiment of the present disclosure provided in isolation.

FIG. 5 is a perspective view of various components of a mold assembly shown in isolation with respect to other mold assembly components, and for illustrative purposes. As shown, a glass saddle 24 is provided, the glass saddle adapted to receive a glass component such a window pane for encapsulation or molding with rubber (EPDM) materials. The glass saddle 24 is provided in force-transmitting communication with at least one and preferably two ramped features 26 or wedges to enable displacement and adjustability of a position of the glass saddle 24. The wedges are moveable in at least one direction by a user-interface 20 which extends outside of mold body (not shown) and that is accessible to a user. A shaft 22 extends inwardly into the mold assembly and/or mold cavity, and is in operable communication with the at least one ramped feature 26. In preferred embodiments, the ramped features and the shaft provide for micro-adjustability of a position of the glass saddle 24. Preferably, and angle of the ramped features does not exceed approximately 7 degrees, and is more preferably of about 2 degrees such that rotation of a dial associated with the user interface 20 provides small and accurate movement of the glass saddle. Such features enhance accuracy and enable movement of various components when heated. These features and devices provide enhancements over cold-molding features which do not need to account for thermal expansion of various elements. The user interface 20 of FIG. 5 is provided as a machined member that extends outwardly from the mold assembly. A dial (not shown) is preferably associated with this component, and a connection between the dial and the shaft 22 is provided inside the user interface 20 shown in FIG. 5. In certain embodiments, the user-interface 20 is provided with cooling features to ensure that a dial or associated device is cool enough to be touched by a user's hand. Such cooling features include, but are not limited to, fans and forced cooling liquids.

As further shown in FIG. 5, cooling channels 30 are provided to convey fluid to, or proximal to, the glass saddle 24 and provide for selective cooling of internal components of the assembly. Air, oil, water, or other coolants may be routed through the channels 30 to promote and enhance cooling of specific features of the interior of the mold assembly. Embodiments of the present disclosure further contemplate that the glass saddle 24 also comprises vent holes 50 for enhancing convective heat transfer from the glass saddle. Accordingly, a two part adjustment system is provided in various embodiments where a position of the glass saddle 24 is altered by at least one of thermal expansion and by manual movement through a user interface 20.

Figure 6:
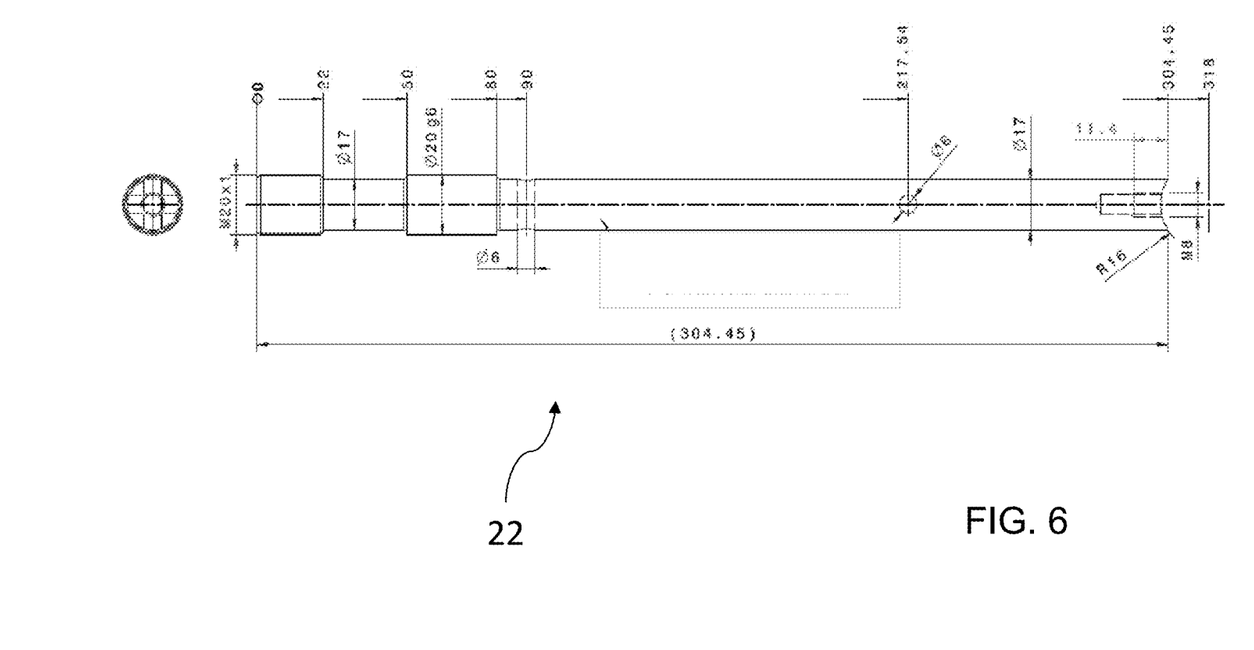
FIG. 6 is a side elevation view of a component of one embodiment of the present disclosure.

FIG. 6 is a side elevation view of a shaft 22 for use in various embodiments of the present disclosure. FIG. 6 includes various dimensions for illustrative purposes and in accordance with one embodiment of the present disclosure. It will be expressly recognized, however, that the present disclosure is not limited to such dimensions and that various shafts 22 of various dimensions may be provided in alternative embodiments.

Figure 7A:
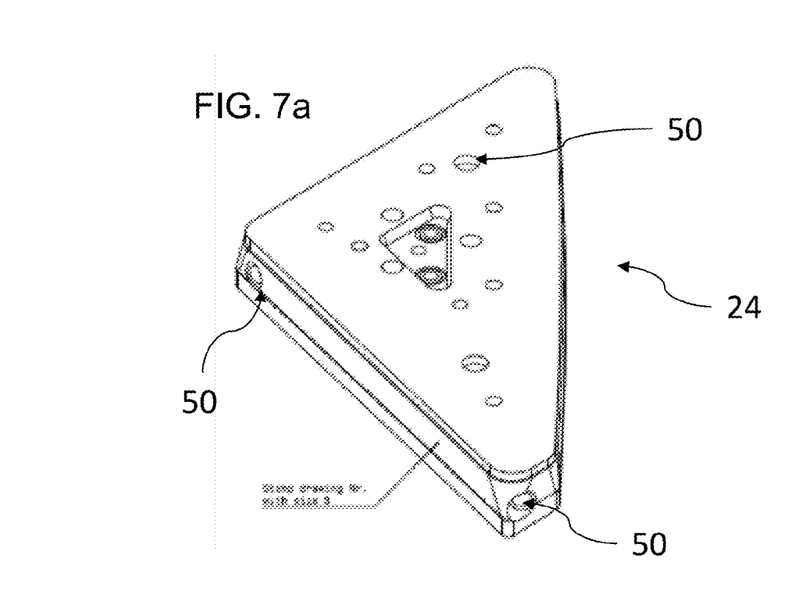
FIG. 7*a* is a perspective view of a component of one embodiment of the present disclosure.
Figure 7B:
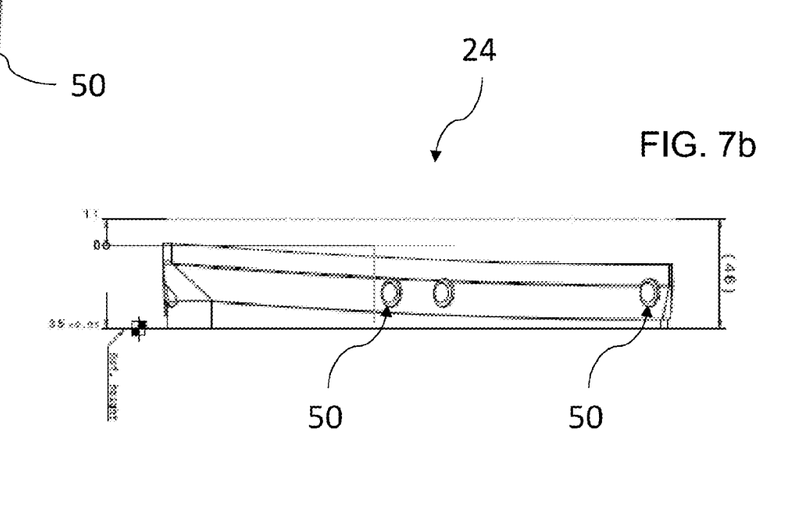
FIG. 7*b* is a side elevation view a component of one embodiment of the present disclosure.

FIG. 7a is a perspective view of a glass saddle 24 according to one embodiment of the present disclosure. FIG. 7b is a side elevation of the glass saddle 24 as shown in FIG. 7a. In various embodiments, the glass saddle 24 comprises a plurality of apertures 50 to enhance cooling of the glass saddle 24. The apertures comprise conduits for cooling channels 30, and/or comprise passive conduits to enable convection of heat from within the saddle.

While various embodiments of the disclosed device have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

The foregoing discussion of the invention has been presented for purposes of illustration and description. The foregoing is not intended to limit the invention to the form or forms disclosed herein. In the foregoing description for example, various features of the invention have been identified. It should be appreciated that these features may be combined together into a single embodiment or in various other combinations as appropriate. The dimensions of the component pieces may also vary, yet still be within the scope of the invention. Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the following claims reflect, inventive aspects lie in less than all features of any single foregoing disclosed embodiment. Thus, the following claims are hereby incorporated into this Detailed Description, with each claim standing on its own as a separate preferred embodiment of the invention.

What is claimed is:

1. A mold assembly for glass encapsulation molding, the mold assembly comprising:
    a mold cavity, the mold cavity comprising an adjustable surface for receiving a glass panel around which a mold material is to be provided;
    a user-interface provided external to the mold cavity such that the user-interface is accessible to a user;
    the user-interface comprising a shaft extending into the mold assembly;
    the user-interface in force-transmitting communication with the shaft and at least one of ramped surface and a spring, and a position of said adjustable surface is adjustable by manipulation of said user-interface;
    said adjustable surface comprising a first material having a coefficient of thermal expansion that is greater than a coefficient of thermal expansion of at least a portion of the mold cavity, such that the adjustable surface expands and contracts at a greater rate than a remainder of the mold cavity.

2. The mold assembly of claim 1, wherein the mold comprises a conduit extending from proximal the adjustable surface to an exterior of the mold assembly, the conduit adapted for promoting heat transfer.

3. The mold assembly of claim 2, wherein at least one of a gas, liquid, water and oil is provided in the conduit.

4. The mold assembly of claim 2, further comprising a pump for pumping at least one fluid through the conduit.

5. The mold assembly of claim 1, wherein the first material comprises a glass saddle for receiving and supporting a glass member during molding operations.

6. The mold assembly of claim 1, wherein the adjustable surface comprises a glass saddle for receiving and supporting a glass member during molding operations.

7. The mold assembly of claim 1, wherein the shaft is provided in communication with a ramped surface, and wherein horizontal movement of the angled ramped surface affects a vertical movement of the adjustable surface.

8. The mold assembly of claim 1, wherein the user-interface comprises an adjustable dial extending outwardly from the mold assembly.

9. A mold assembly for molding at least one attachment member on a glass member, said mold assembly comprising:
    an upper mold section and lower mold section, the upper mold section comprising a first sheet holding surface;

an adjustable pressure pad provided in force-transmitting communication with the first sheet holding surface;

a first mold cavity defined by at least one of the upper mold section, the lower mold section, and the adjustable pressure pad;

at least one spring urging the adjustable pressure pad toward the upper mold section for holding a glass member therebetween;

at least one of the upper and lower mold sections including a moldable material delivery system for directing moldable material;

an adjustment member comprising a shaft extending within the mold assembly and a user-interface in force-transmitting communication with the shaft, the user-interface provided external to the mold cavity and accessible to a user.

10. The mold assembly of claim 9, wherein the pressure pad comprises a glass saddle for receiving and supporting a glass member.

11. The mold assembly of claim 9, wherein the adjustment member is operable to move the pressure pad.

12. The mold assembly of claim 9, wherein the adjustment member is operable to move the first sheet holding surface.

13. The mold assembly of claim 9, wherein the first sheet holding surface comprises a coefficient of thermal expansion that is greater than a coefficient of thermal expansion of a remainder of the assembly, and wherein the first sheet holding surface expands and contracts at a greater rate than the remainder of the assembly.

14. The mold assembly of claim 9, wherein the user-interface comprises an adjustable dial provided externally to the mold cavity and the first and second mold sections such that a user may contact and manipulate the user-interface to externally adjust internal components of the mold assembly.

15. A method of glass encapsulation molding, the method comprising the steps of:

providing a mold assembly comprising a mold cavity, said mold cavity comprising an adjustable surface for receiving a glass panel;

wherein said adjustable surface is provided in force-transmitting communication with at least one of a wedge and a spring, and said adjustable surface is adjustable by manipulation of a user-interface extending outwardly from the mold cavity;

inserting a glass panel into said mold cavity, wherein at least one surface of said glass panel is provided in contact with said adjustable surface;

adjusting a position of said adjustable surface by manipulation of said user-interface;

heating the mold cavity to a desired operating temperature, wherein heating of the mold cavity causes the adjustable surface to expand and wherein the expansion of the adjustable surface creates an interference fit between at least a portion of said adjustable surface and at least a portion of the mold cavity; and injecting a moldable material into the mold cavity and allowing said moldable material to form to at least one of an inner-surface of the mold cavity and the glass panel.

16. The method of glass encapsulation molding according to claim 15, further comprising the step of activating a cooling process of the mold, the cooling process comprising directing a cooling fluid through at least a portion of the mold assembly.

17. The method of glass encapsulation molding according to claim 16, further comprising adjusting the user-interface subsequent to the cooling process and wherein the cooling process enables the adjustment of the user-interface.

18. The method of glass encapsulation molding according to claim 15, wherein the adjustable surface comprises a different coefficient of thermal expansion than a remainder of the mold assembly.

19. The method of glass encapsulation molding according to claim 16, wherein the cooling process comprises directing a fluid through a closed conduit extending into at least a portion of the mold assembly.

20. The method of glass encapsulation molding according to claim 16, wherein the cooling process comprises venting air from the mold assembly to an outside environment.

* * * * *